(12) United States Patent
Terazawa (10) Patent No.: US 8,555,724 B2
(45) Date of Patent: Oct. 15, 2013

(54) ULTRASONIC SENSOR

(75) Inventor: Hidehito Terazawa, Obu (JP)

(73) Assignee: Denso Corporation, Kariya (JP)

( * ) Notice: Subject to any disclaimer, the term of this patent is extended or adjusted under 35 U.S.C. 154(b) by 627 days.

(21) Appl. No.: 12/798,229

(22) Filed: Mar. 30, 2010

(65) Prior Publication Data

US 2010/0242611 A1    Sep. 30, 2010

(30) Foreign Application Priority Data

Mar. 31, 2009  (JP) .................................. 2009-84314

(51) Int. Cl.
*G01N 29/34*   (2006.01)

(52) U.S. Cl.
USPC ......... 73/632; 310/315; 310/316.03; 310/317

(58) Field of Classification Search
USPC ................ 73/632; 310/315, 316, 317, 316.03
See application file for complete search history.

(56) References Cited

U.S. PATENT DOCUMENTS

| | | | | |
|---|---|---|---|---|
| 4,223,242 A | * | 9/1980 | Redlich et al. | ........... 310/316.01 |
| 4,977,380 A | * | 12/1990 | Martin et al. | ................... 331/74 |
| 5,198,713 A | * | 3/1993 | Suzuta | ..................... 310/316.01 |
| 5,311,093 A | | 5/1994 | Mukohjima | |
| 5,757,104 A | * | 5/1998 | Getman et al. | ................ 310/317 |
| 5,777,860 A | * | 7/1998 | Halbert | ............................ 363/34 |
| 5,917,776 A | * | 6/1999 | Foreman | ........................ 367/93 |
| 5,987,992 A | | 11/1999 | Watanabe et al. | |
| 7,423,502 B2 | * | 9/2008 | Razafimandimby et al. | . 333/188 |
| 2003/0036704 A1 | * | 2/2003 | Cerofolini | ..................... 600/437 |
| 2004/0226378 A1 | | 11/2004 | Oda et al. | |

FOREIGN PATENT DOCUMENTS

| | | | |
|---|---|---|---|
| JP | 06230119 A | * | 8/1994 |
| JP | 2002-058091 | | 2/2002 |

OTHER PUBLICATIONS

Office Action issued May 22, 2012 in corresponding Chinese Application No. 201010139903.X (with English translation).
Examination Report issued Jan. 21, 2013 in corresponding Chinese Application No. 201010139903.X with English translation.

\* cited by examiner

*Primary Examiner* — Peter Macchiarolo
*Assistant Examiner* — Rose M Miller
(74) *Attorney, Agent, or Firm* — Harness, Dickey & Pierce, PLC (57) ABSTRACT

A single element of an ultrasonic transducer includes at least one combination of an equivalent series capacitor C1, an equivalent series inductor L1, and an equivalent series resistance R1. The ultrasonic transducer further includes an equivalent parallel capacitor C0. An inductor L2 is connected in series between the ultrasonic transducer and the drive circuit. A first resonance frequency of the equivalent series capacitor C1 and the equivalent series inductor L1 is F0. A second resonance frequency determined by at least the equivalent parallel capacitor C0 and the inductor L2 is Fp. A drive circuit drives the ultrasonic transducer while switching the driving frequency of the ultrasonic transducer to one of the resonance frequency F0 and the resonance frequency Fp.

16 Claims, 8 Drawing Sheets

DEAD ZONE

FIG. 8B
PRIOR ART

DEAD ZONE

ULTRASONIC SENSOR

CROSS REFERENCE TO RELATED APPLICATIONS

This application is based on and incorporates herein by reference Japanese Patent Application No. 2009-84314 filed on Mar. 31, 2009.

FIELD OF THE INVENTION

The present invention relates to an ultrasonic sensor.

BACKGROUND OF THE INVENTION

Conventionally, an ultrasonic sensor, which is for detecting the distance from an object or existence of an object by transmitting an ultrasonic wave at a predetermined frequency and receiving a reflective wave reflected from an object, is known. In recent years, an ultrasonic sensor is used to detect an obstacle around a vehicle. A directivity characteristic of an ultrasonic sensor radially diffuses. Therefore, an ultrasonic sensor may erroneously detect a curbstone located on a road surface in a parking area, a road surface, and/or the like as an obstacle at a distance of several meters when the directivity characteristic of an ultrasonic sensor is not limited to a narrow range. For example, JP-A-2002-58091 discloses an ultrasonic sensor capable of further limiting a directivity characteristic. An ultrasonic sensor is required to have a wide directivity characteristic to detect an obstacle at a short distance of tens of centimeters. Therefore, an ultrasonic sensor having a wide directivity characteristic is used to detect an obstacle at a short distance.

However, the ultrasonic sensor of JP-A-2002-58091 having a narrow directivity characteristic cannot detect an obstacle in a wide detection area, such as a periphery of a vehicle, rather than an obstacle at a distance of several meters away. On the other hand, when an ultrasonic sensor has a wide directivity characteristic to detect an obstacle at a distance of several meters away, as described above, the ultrasonic sensor may erroneously detect a curbstone on a road surface in a parking area, a road surface, and/or the like as an obstacle. Therefore, the conventional structure has a problem that multiple ultrasonic sensor elements having different directivity characteristics are required respectively for different detection areas. It is conceived to switch among multiple directivity characteristics in one ultrasonic sensor element. However, it is difficult to obtain excellent directivity characteristics having different ranges in one ultrasonic sensor element.

SUMMARY OF THE INVENTION

In view of the foregoing and other problems, it is an object of the present invention to produce a single element of an ultrasonic sensor configured to switch between or among multiple directivity characteristics having different ranges to obtain a suitable directivity characteristic.

According to one aspect of the present invention, an ultrasonic sensor comprises a single element of an ultrasonic transducer including at least one combination of an equivalent series capacitor C1, an equivalent series inductor L1, and an equivalent series resistance R1. The ultrasonic transducer further includes an equivalent parallel capacitor C0. The ultrasonic sensor further comprises a drive circuit configured to drive the ultrasonic transducer. The ultrasonic sensor further comprises an inductor L2 connected in series between the ultrasonic transducer and the drive circuit. The drive circuit is configured to switch a driving frequency of the ultrasonic transducer. A first resonance frequency of the equivalent series capacitor C1 and the equivalent series inductor L1 is F0. A second resonance frequency determined by at least the equivalent parallel capacitor C0 and the inductor L2 is Fp. The drive circuit is configured to drive the ultrasonic transducer while switching the driving frequency to one of the first resonance frequency F0 and the second resonance frequency Fp.

According to another aspect of the present invention, an ultrasonic sensor comprises a single element of an ultrasonic transducer including at least one Combination of an equivalent series capacitor C1, an equivalent series inductor L1, and an equivalent series resistance R1. The ultrasonic transducer further includes an equivalent parallel capacitor C0. The ultrasonic sensor further comprises a drive circuit configured to drive the ultrasonic transducer. The ultrasonic sensor further comprises a transformer TR connected between the ultrasonic transducer and the drive circuit. The drive circuit is configured to switch a driving frequency of the ultrasonic transducer. A first resonance frequency of the equivalent series capacitor C1 and the equivalent series inductor L1 is F0. A second resonance frequency determined by at least the equivalent parallel capacitor C0 and the transformer TR is Fp. The drive circuit is configured to drive the ultrasonic transducer while switching the driving frequency to one of the first resonance frequency F0 and the second resonance frequency Fp.

According to another aspect of the present invention, a method for driving an ultrasonic sensor, the method comprises causing a drive circuit to oscillate a single element of an ultrasonic transducer at a driving frequency, the ultrasonic transducer including at least one combination of an equivalent series capacitor C1, an equivalent series inductor L1, and an equivalent series resistance R1, the ultrasonic transducer further including an equivalent parallel capacitor C0, wherein one of an inductor L2 and a transformer TR is connected in series between the ultrasonic transducer and the drive circuit. The method further comprises switching the driving frequency to one of a first resonance frequency F0 and a second resonance frequency Fp. The first resonance frequency F0 is determined by the equivalent series capacitor C1 and the equivalent series inductor L1. The second resonance frequency Fp is determined by at least the equivalent parallel capacitor C0 and the one of the inductor L2 and the transformer TR.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (Embodiment)

Figure 1:
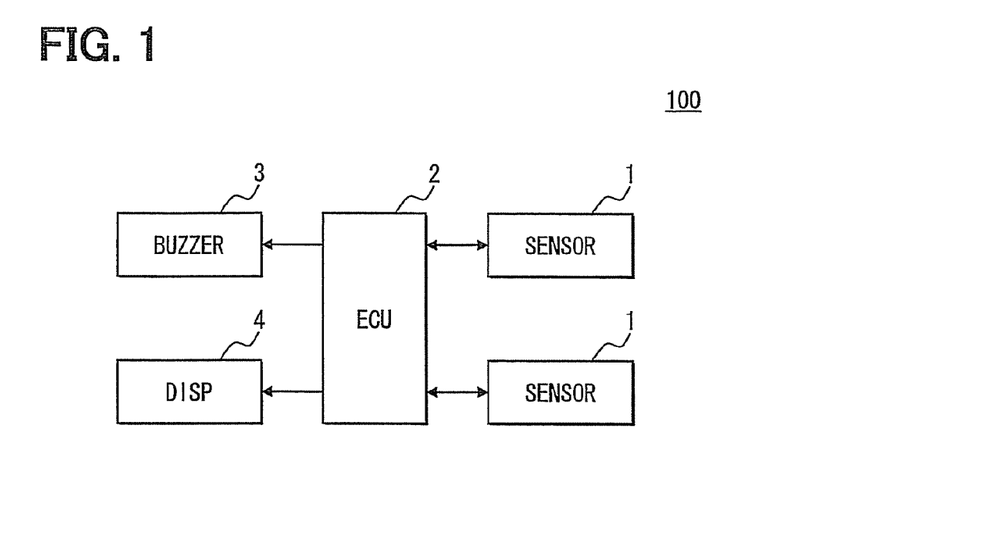
FIG. 1 is a block diagram showing an overview structure of an obstacle detecting system.

As follows, an embodiment will be described with reference to drawings. FIG. 1 is a block diagram showing an obstacle detecting system 100. The obstacle detecting system 100 shown in FIG. 1 is mounted to a vehicle. The obstacle detecting system 100 includes an ultrasonic sensor 1, an ECU 2, a buzzer 3, and a display device 4. The ultrasonic sensor 1, the ECU 2, the buzzer 3, and the display device 4 are connected with each other via an in-vehicle LAN, such as a controller area network (CAN), which conforms to a communications protocol. An electronic control unit (ECU) 2 is mainly configured of a microcomputer including a CPU, a ROM, a RAM, a backup RAM, and the like (none shown). The ECU 2 performs various kinds of operations by executing various kinds of control programs stored in the ROM. For example, the ECU 2 executes an operation related to transmission of a burst wave from the ultrasonic sensor 1 and reception of a reflective wave from an obstacle. The ECU 2 detects a distance from an obstacle and determines the position of the obstacle according to information on a burst wave transmitted from the ultrasonic sensor 1 and information on a reflective wave from the obstacle. The ECU 2 performs an operation related to information of the detected distance from the obstacle and the determined position of the obstacle. For example, the ECU 2 causes the display device 4 to indicate an alarm and causes the buzzer 3 to give a warning sound when determining that an obstacle exists in the vicinity of the vehicle. The display device 4 may be configured of a liquid crystal display, an organic electroluminescence (EL) display, a plasma display, and the like for indicating a text, an image, and the like. The display device 4 may also serve as a display device of an in-vehicle navigation device.

Figure 2:
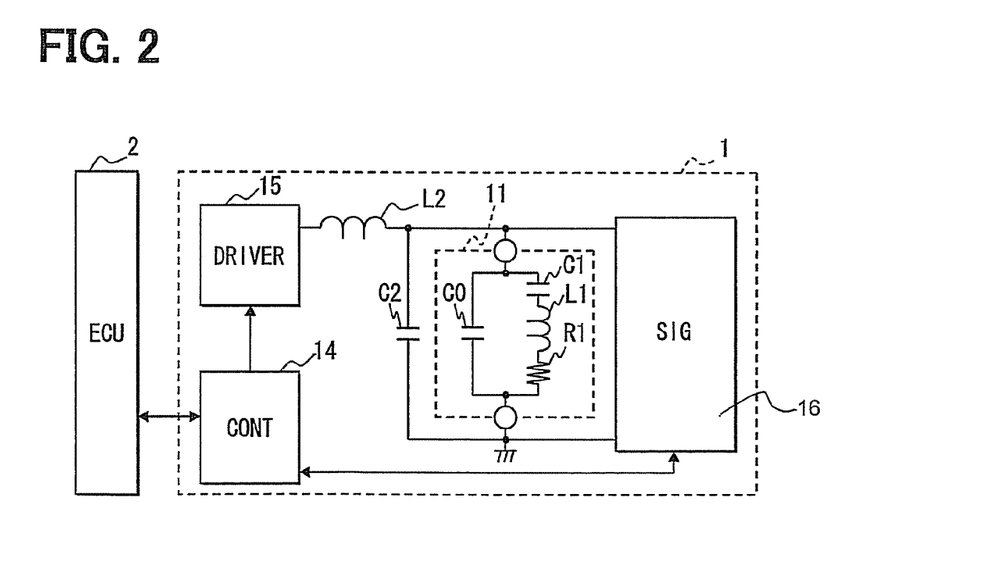
FIG. 2 is a schematic diagram showing an overview structure of an ultrasonic sensor according to one embodiment.

Multiple ultrasonic sensors 1 are provided, for example, in a rear bumper of the vehicle to detect an obstacle around the rear side of the vehicle. As follows, an overview structure of the ultrasonic sensor 1 will be described with reference to FIG. 2. FIG. 2 is a block diagram showing an overview structure of the ultrasonic sensor 1 according to the present embodiment. The ultrasonic sensor 1 is, for example, a piezo-electric-oscillator-type ultrasonic sensor. More specifically, the ultrasonic sensor 1 is, for example, an obstacle detection sensor configured to both transmit and receive an ultrasonic wave for detecting an obstacle. For example, the ultrasonic sensor 1 is configured to transmit an ultrasonic wave, specifically a burst wave, from an ultrasonic microphone 11 as a piezoelectric oscillator, and thereafter receive a reflective wave from an obstacle as a detected object. The ultrasonic sensor 1 includes the ultrasonic microphone 11, an inductor L2 as an inductance component, a capacitor C2 as a capacitance component, a control unit 14, a drive circuit 15, and a signal processing part 16. The ultrasonic microphone 11 is mounted to a case (not shown). The ultrasonic microphone 11 is configured to vibrate to generate an ultrasonic wave and receive a reflective wave reflected from an obstacle. The ultrasonic microphone 11 obtains a received signal of the reflective wave and outputs the obtained received signal to the signal processing part 16. The ultrasonic microphone 11 may be a piezoelectric oscillator or the like formed of a sintered compact of a piezoelectric ceramics such as lead zirconate titanate (PZT) or barium titanate.

Figure 3A:
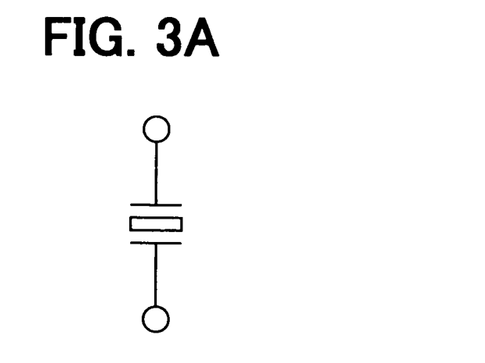
FIG. 3A is a circuit diagram showing an ultrasonic microphone.
Figure 3B:
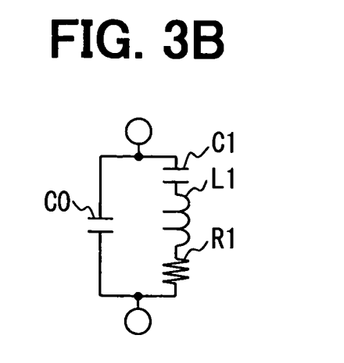
FIG. 3B is a circuit diagram showing an equivalent circuit of the ultrasonic microphone.

As disclosed in FIG. 6 of U.S. Pat. No. 5,987,992 (JP-A-10-257595), a piezoelectric oscillator may be represented by an equivalent circuit in FIG. 3A. Therefore, the ultrasonic microphone 11 as a piezoelectric transducer may be represented by an equivalent circuit. As shown in FIG. 3B the ultrasonic microphone 11 can be represented by a single piezoelectric transducer including a series combination of an equivalent series capacitor C1, an equivalent in-series inductor L1, and an equivalent series resistance R1 and a parallel component of an equivalent parallel capacitor C0. The equivalent series capacitor C1 is a component functioning as an equivalent series capacitor. The equivalent series inductor L1 is a component functioning as an equivalent series inductor. The equivalent series resistance R1 is a component functioning as an equivalent series resistance. The equivalent parallel capacitor C0 is a component functioning as an equivalent parallel capacitor. The ultrasonic microphone 11 functions as an ultrasonic transducer.

An inductor L2 is an inductance component connected in series between the ultrasonic microphone 11 and the drive circuit 15 for forming a resonant circuit. A capacitor C2 is connected to the ultrasonic microphone 11 in parallel for controlling a resonance frequency Fp. An electric capacity of the capacitor C2 is arbitrarily determined according to a desired resonance frequency Fp. The capacitor C2 may be arbitrarily selected from general-purpose capacitors.

In the present embodiment, a resonance frequency of the equivalent series capacitor C1 and the equivalent series inductor L1 is set to F0, and a resonance frequency of the equivalent parallel capacitor C0, the capacitor C2, and the inductor L2 is set to Fp. The resonance frequency F0 is determined according to a relational expression of $F0=[1/(4 \cdot \pi^2 \cdot \text{inductance of } L1 \cdot \text{capacitance of } C1)]^{0.5}$. The resonance frequency Fp is determined according to a relational expression of $Fp=[1/\{4 \cdot \pi^2 \cdot \text{inductance of } L2 \cdot (\text{capacitance of } C0+\text{capacitance of } C2)\}]^{0.5}$.

The control unit 14 transmits a pulse signal of a frequency, which is instructed from the ECU 2, to the drive circuit 15 at a transmission time point instructed from the ECU 2. The drive circuit 15 is applied with a power supply voltage by the ultrasonic sensor 1 and activated. Thereby, the drive circuit 15 activates the ultrasonic microphone 11 to oscillate the ultrasonic microphone 11 at a driving frequency, which is instructed by the ECU 2. Thus, the drive circuit 15 transmits an ultrasonic wave according to the pulse signal outputted from the control unit 14. Specifically, in response to the pulse signal from the control unit 14 according to the instruction from the ECU 2, the drive circuit 15 alternately oscillates the ultrasonic microphone 11 at a driving frequency, which is the same as the resonance frequency F0, and a driving frequency, which is the same as the resonance frequency Fp, to transmit an ultrasonic wave. The control unit 14 executes various kinds of operations according to instructions from the ECU 2.

A signal processing unit 16 receives a signal obtained by the ultrasonic microphone 11 and amplifies the received signal. The signal processing unit 16 further performs various computations of the signal for outputting the signal as an output signal of the ultrasonic sensor 1 for, for example, warning of an obstacle. More specifically, the received signal is processed through an amplification circuit (Amp), a band-pass filter (BPF), a demodulation circuit, and a waveform shaping circuit in the signal processing unit 16. In the comparator (Comp), the processed signal is further compared with a threshold outputted from a threshold setting circuit.

Figure 4:
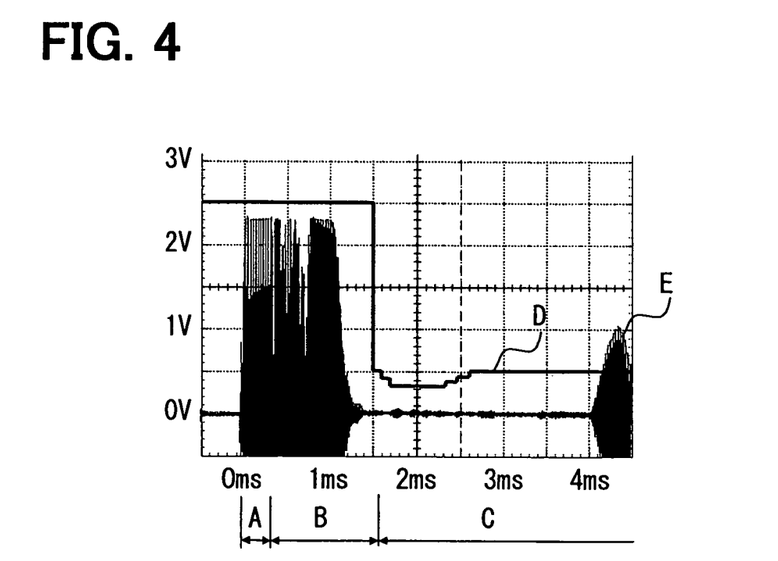
FIG. 4 is a graph showing one example of an output waveform of a band pass filter.

FIG. 4 shows one example of an output waveform of the BPF. In FIG. 4, the vertical axis corresponds to a voltage with a unit of volt (V), and the horizontal axis corresponds to a time with a unit of millisecond (ms). FIG. 4 shows one example of an output waveform in a case where the distance between the ultrasonic sensor and an obstacle is 690 mm. In FIG. 4, the notation A shows a transmitting section, the notation B shows a vibration suppressing section, the notation C shows a receiving section, the notation D shows the threshold, and the notation E shows a reflective waveform from the obstacle. In the signal processing unit 16, a demodulation processing and a waveform shaping processing of the reflective waveform is performed, and the processed reflective waveform is compared with the threshold.

A gain of the Amp may be selected stepwise by a gain control circuit of the signal processing unit 16. The gain control circuit may be controlled by the control unit 14 via a microcomputer in the signal processing unit 16. The BPF is a switched-capacitor-type filter. A center frequency and a Q-value of the BPF may be selected by the control unit 14 via a microcomputer in the signal processing unit 16 according to the driving frequency of the ultrasonic microphone 11. The threshold is determined beforehand according to a directivity characteristic of the ultrasonic sensor 1 so as to encompass a detection area, which the ultrasonic sensor 1 is supposed to detect an object. When a microcomputer of the signal processing unit 16 determines that the received signal, which is processed through the Amp, the BPF, the demodulation circuit, and the waveform shaping circuit, is greater than the threshold based on an output signal from the comparator, the signal processing unit 16 transmits a time signal at the time point to the ECU 2 through the control unit 14 via an in-vehicle LAN. The ECU 2 determines the distance and/or the position relative to an obstacle according to the time signal transmitted from the signal processing unit 16 and causes the display device 4 and/or the buzzer 3 to perform a warn operation. The ECU 2 determines the position of the obstacle based on which ultrasonic sensor of the multiple ultrasonic sensors 1 transmitted the time signal.

The present inventor researched a single element of the ultrasonic microphone 11 including at least one combination of an equivalent series capacitor C1, an equivalent series inductor L1, and an equivalent series resistance R1, and further an equivalent parallel capacitor C0. Consequently, the present inventor investigated that when an inductor L2 is connected in series between the drive circuit 15, which drives the ultrasonic microphone 11, and the ultrasonic microphone 11, an excellent peak is obtained in a sound pressure transmitted from the ultrasonic microphone 11 at a driving frequency same as a resonance frequency F0 of the equivalent series capacitor C1 and the equivalent series inductor L1. In addition, the present inventor investigated that an excellent peak is obtained in a sound pressure transmitted from the ultrasonic microphone 11 at a driving frequency same as a resonance frequency Fp determined based on the equivalent parallel capacitor C0 and the inductor L2.

Figure 5A:
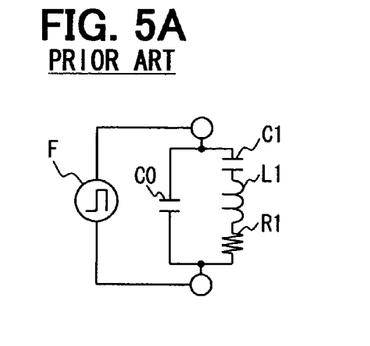
FIG. 5A is a schematic diagram showing a conventional ultrasonic microphone and a drive circuit of a conventional ultrasonic microphone according to a prior art.
Figure 5B:
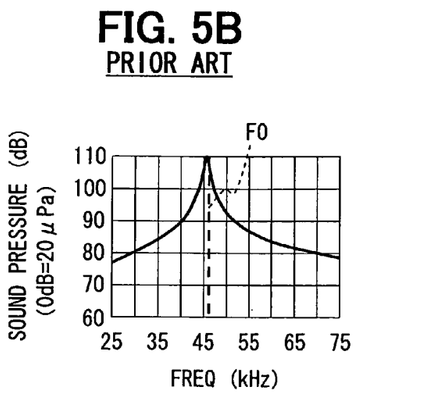
FIG. 5B is a graph showing one example of a frequency characteristic of a voltage between microphone terminals of the ultrasonic microphone according to the prior art.
Figure 6A:
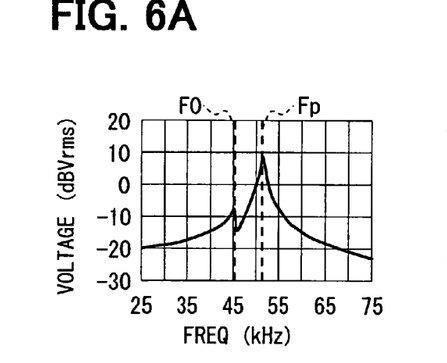
FIG. 6A is a graph showing one example of a frequency characteristic of a voltage between microphone terminals of the ultrasonic microphone according to the present embodiment.
Figure 6B:
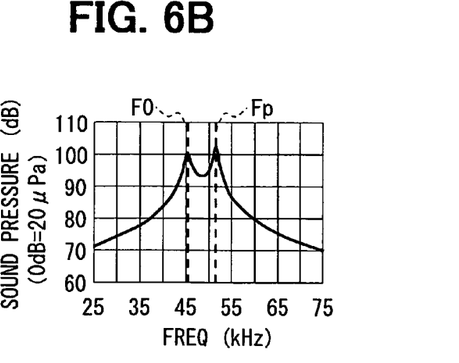
FIG. 6B is a graph showing one example of a frequency characteristic of a transmitted sound pressure of the ultrasonic microphone according to the present embodiment.

As follows, the present phenomenon will be described with reference to FIGS. 5A to 6B. FIG. 5A is a schematic diagram showing a conventional ultrasonic microphone and its drive circuit, according to a prior art. FIG. 5B is a graph showing one example of a frequency characteristic of a sound pressure transmitted from the conventional ultrasonic microphone shown in FIG. 5A, according to the prior art. FIG. 6A is a graph showing one example of a frequency characteristic of a voltage between microphone terminals of the ultrasonic microphone 11 according to the present embodiment. FIG. 6B is a graph showing one example of a frequency characteristic of a transmitted sound pressure of the ultrasonic microphone 11 according to the present embodiment.

As shown in FIG. 5A, the conventional ultrasonic microphone includes a combination of an equivalent series capacitor C1, an equivalent series inductor L1, an equivalent series resistance R1, and an equivalent parallel capacitor C0. Dissimilarly to the ultrasonic microphone 11 of the present embodiment, an inductor is not provided between a drive circuit and an ultrasonic microphone in the conventional ultrasonic microphone. In FIG. 5A, the drive circuit is depicted by a simplified notation F for convenience of explanation. In the conventional ultrasonic microphone, a transmitted sound pressure becomes maximum, thereby an excellent peak can be obtained at a frequency given by a relational expression of $F0=[1/(4 \cdot \pi^2 \cdot \text{inductance of } L1 \cdot \text{capacitance of } C1)]^{0.5}$. For example, in the example of the conventional ultrasonic microphone shown in FIG. 5B, the inductance of the L1 and the capacitance of the C1 are selected so as to obtain the resonance frequency F0 of about 45.7 kHz. Therefore, as shown in FIG. 5b, an excellent peak is obtained at about 45.7 kHz in the transmitted sound pressure. In FIG. 5B, the vertical axis corresponds to a sound pressure with a unit of dB (0 dB=20 μPa), and the horizontal axis corresponds to a time with a unit of millisecond (ms).

In the ultrasonic microphone 11 according to the present embodiment, a resonant circuit including the inductor L2, the capacitor C2, and the equivalent parallel capacitor C0, applies a voltage between the microphone terminals of the ultrasonic microphone 11. The present voltage becomes maximum at a resonance frequency of $Fp=[1/\{4\cdot\pi^2\cdot\text{inductance of } L2\cdot(\text{capacitance of } C0+\text{capacitance of } C2)\}]^{0.5}$. For example, in a case where the inductance of the L2, the capacitance of the C0, and the capacitance of the C2 are selected to obtain resonance frequency Fp of about 51.6 kHz, as shown in FIG. 6A, a large voltage peak can be obtained between the microphone terminals at about 51.6 kHz. In FIG. 6A, the vertical axis corresponds to a voltage with a unit of dbVrms (0 dB=1 Vrms), and the horizontal axis corresponds to a frequency with a unit of kHz. In the present embodiment, it is assumed that the inductance of the L1 and the capacitance of the C1 are selected so as to obtain the resonance frequency F0 of about 45.7 kHz of the ultrasonic microphone 11. Thus, as shown in FIG. 6A, a small peak can be obtained between the microphone terminals at about the 45.7 kHz.

In addition, as shown in FIG. 6B, excellent peaks including large and small voltage peaks can be obtained between the microphone terminals at both frequencies of about 45.7 kHz and about 51.6 kHz corresponding to the resonance frequency F0 and the resonance frequency Fp in a frequency characteristic of the sound pressure transmitted from the ultrasonic microphone 11 according to the present embodiment. According to the present structure, any one of the two kinds of the driving frequency, which is the same as the resonance frequency F0, and the driving frequency, which is the same as the resonance frequency Fp, enables the single element of the ultrasonic microphone 11 to cause an excellent transmitted sound pressure. Thus, the single element of the ultrasonic microphone 11 can have further excellent directivities in two different ranges. In FIG. 6B, the vertical axis corresponds to a sound pressure with a unit of dB (0 dB=20 µPa) and the horizontal axis corresponds to a time with a unit of millisecond (ms).

A directivity characteristic of a sound pressure transmitted from the ultrasonic microphone 11 becomes wide when the driving frequency becomes low and becomes narrow when the driving frequency becomes high. Therefore, according to the present structure, a single element of the ultrasonic microphone 11 can have two kinds of excellent directivity characteristics in different ranges. Thus, a suitable directivity characteristic can be obtained by arbitrary selecting one of the driving frequencies according to a detection distance. Thereby, the detection areas can be easily specified according to the detection distance. Furthermore, the ultrasonic microphone 11 may be driven alternately at the driving frequency same as the resonance frequency F0 and the driving frequency same as the resonance frequency Fp. Therefore, the detection area of the ultrasonic sensor having the single element of the ultrasonic microphone can be enlarged. Consequently, the number of ultrasonic sensors can be reduced in a case where multiple ultrasonic sensors having different directivity characteristics are conventionally needed.

Figure 7A:
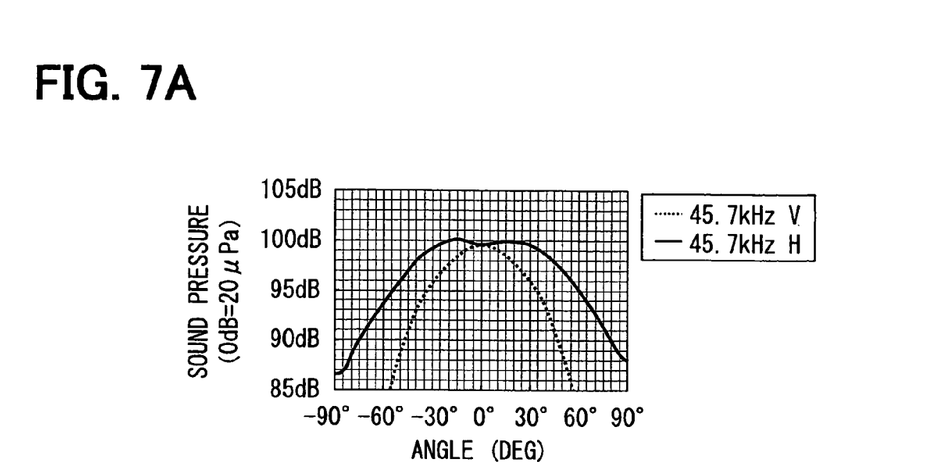
FIG. 7A is a graph showing one example of a directivity characteristic of a transmitted sound pressure when the ultrasonic microphone according to the present embodiment is driven at a driving frequency of 45.7 kHz.
Figure 7B:
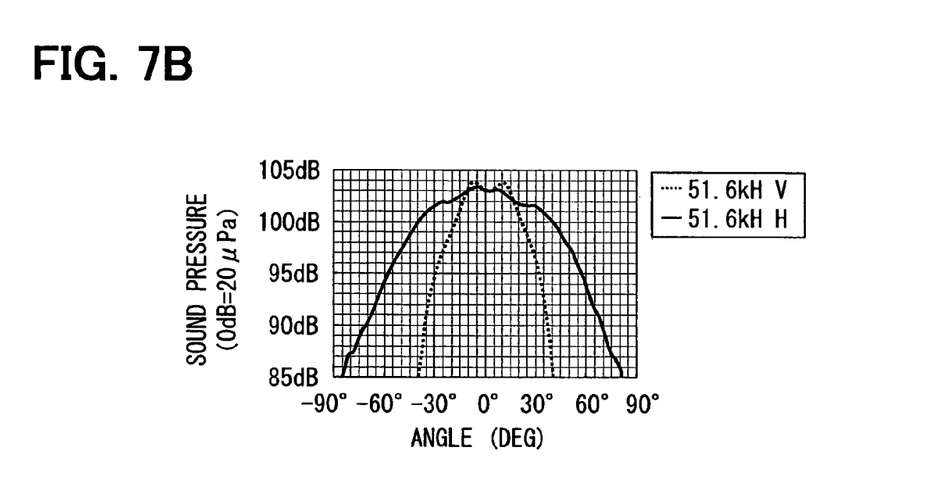
FIG. 7B is a graph showing one example of a directivity characteristic of a transmitted sound pressure when the ultrasonic microphone according to the present embodiment is driven at a driving frequency of 51.6 kHz.
Figure 8A:
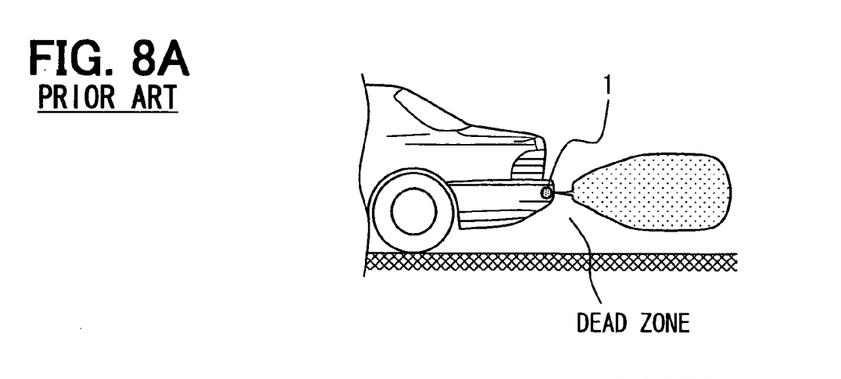
FIG. 8A is a schematic view showing a detection area of a conventional middle-distance ultrasonic sensor according to the prior art in the vertical direction.
Figure 8B:
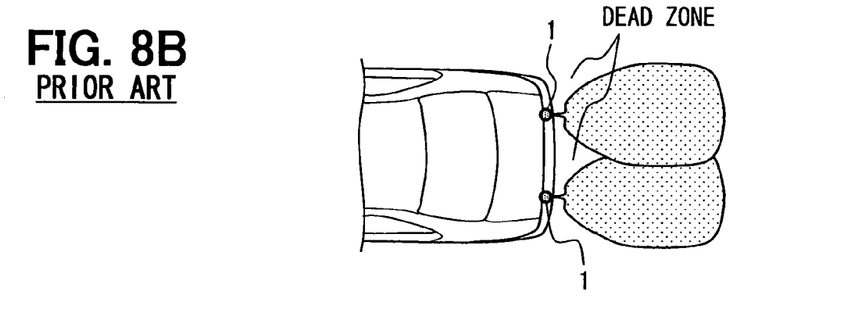
FIG. 8B is a schematic view showing a detection area of the conventional middle-distance ultrasonic sensor according to the prior art in the horizontal direction.
Figure 9A:
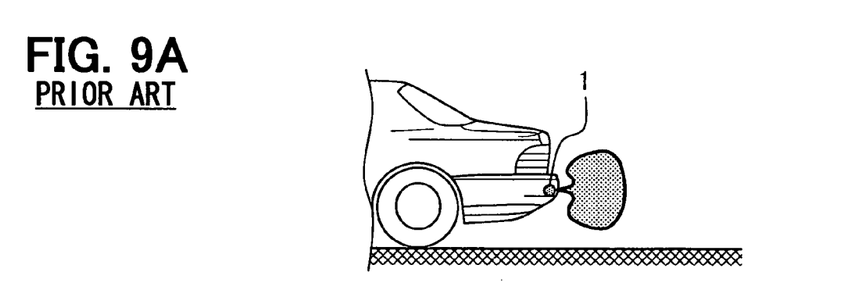
FIG. 9A is a schematic view showing a detection area of a conventional short-distance ultrasonic sensor according to the prior art in the vertical direction.
Figure 9B:
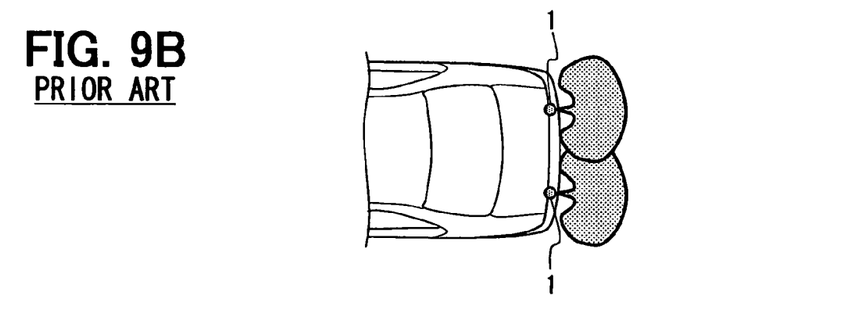
FIG. 9B is a schematic view showing a detection area of the conventional short-distance ultrasonic sensor according to the prior art in the horizontal direction.
Figure 10A:
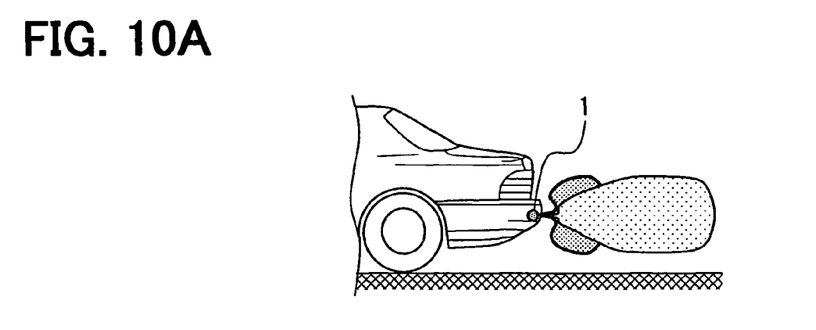
FIG. 10A is a schematic view showing a detection area of the ultrasonic sensor according to the present embodiment in the vertical direction.
Figure 10B:
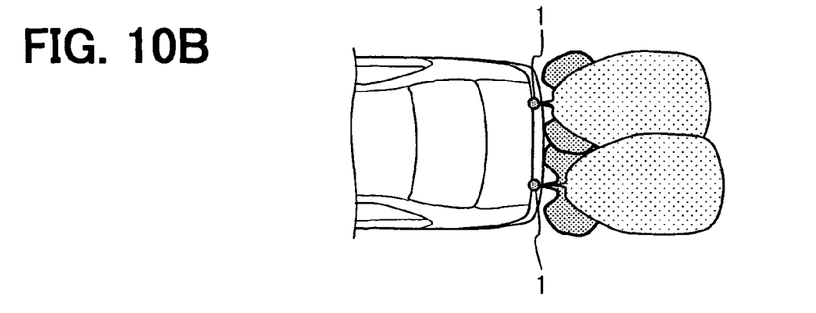
FIG. 10B is a schematic view showing a detection area of the ultrasonic sensor according to the present embodiment in the horizontal direction.

As follows, an operation effect of the present embodiment will be further described in detail with reference to FIGS. 7A to 9B. FIG. 7A is a graph showing one example of a directivity characteristic of a transmitted sound pressure when the ultrasonic microphone 11 is driven at a driving frequency of 45.7 kHz. In FIG. 7A, the vertical axis corresponds to a sound pressure with a unit of decibel (dB), and the horizontal axis corresponds to an angle (degree). In FIG. 7A, the solid line shows a directivity characteristic in the horizontal direction, and the dashed line shows a directivity characteristic in the vertical direction. FIG. 7B is a graph showing one example of a directivity characteristic of a transmitted sound pressure when the ultrasonic microphone 11 is driven at a driving frequency of 51.6 kHz. In FIG. 7B, the vertical axis corresponds to a sound pressure with a unit of decibel (dB), and the horizontal axis corresponds to an angle (degree). In FIG. 7B, the solid line shows a directivity characteristic in the horizontal direction, and the dashed line shows a directivity characteristic in the vertical direction. FIG. 8A is a schematic view showing a detection area of a conventional middle-distance ultrasonic sensor in the vertical direction, according to a prior art. FIG. 8B is a schematic view showing a detection area of the conventional middle-distance ultrasonic sensor in the horizontal direction, according to a prior art. FIG. 9A is a schematic view showing a detection area of a conventional short-distance ultrasonic sensor in the vertical direction, according to a prior art. FIG. 9B is a schematic view showing a detection area of the conventional short-distance ultrasonic sensor in the horizontal direction, according to a prior art. FIG. 10A is a schematic view showing a detection area of the ultrasonic sensor 1 in the vertical direction, according to the present embodiment. FIG. 10B is a schematic view showing a detection area of the ultrasonic sensor 1 in the horizontal direction, according to the present embodiment.

When the ultrasonic microphone 11 is driven at the driving frequency of 45.7 kHz, which is lower than the driving frequency of 51.6 kHz, the directivity characteristics of the transmitted sound pressure shown in FIG. 7A are wider in both the horizontal direction and the perpendicular direction than the directivity characteristics of the transmitted sound pressure as shown in FIG. 7B when the ultrasonic microphone 11 is driven at the driving frequency of 51.6 kHz. Therefore, obviously from the directivity characteristics of the transmitted sound pressure shown in FIG. 7A, the ultrasonic sensor 1 has a detection range of ±90 degrees in both the horizontal and vertical directions and is capable of detecting an obstacle, which exists in a short distance in the detection range. However, obviously from the directivity characteristic of a transmitted sound pressure shown in FIG. 7A, when the threshold is increased to enable detection of an obstacle in a long distance of several meters away, the ultrasonic sensor 1 may detect a road surface, a curbstone located on a road surface in a parking area, and the like, since the ultrasonic sensor 1 has a wider directivity characteristic. Accordingly, it may be hard to apply the ultrasonic sensor 1 to detection for an obstacle in a long-distance. In view of the foregoing, the ultrasonic sensor 1 is required to detect an obstacle in a long distance of several meters away, without detecting a road surface, a curbstone located on a road surface in a parking area, and the like. However, obviously from the directivity characteristics of the transmitted sound pressure shown in FIG. 7A, even when the threshold is decreased as much as possible, the ultrasonic microphone 11 cannot detect an obstacle in a short distance such as several tens of centimeters in the horizontal direction and an obstacle in a range of about ±90 degrees in the vertical directions.

On the contrary, when the ultrasonic microphone 11 is driven at the driving frequency of 51.6 kHz higher than the driving frequency of 45.7 kHz, the directivity characteristics of the transmitted sound pressure shown in FIG. 7B are narrower in both the horizontal direction and the perpendicular direction than the directivity characteristics of the transmitted sound pressure as shown in FIG. 7A when the ultrasonic microphone 11 is driven at the driving frequency of 45.7 kHz. In this case, the ultrasonic sensor 1 is capable of detecting an obstacle in a long distance of several meters away, without detecting a road surface, a curbstone located on a road surface in a parking area, and the like. However, obviously from the directivity characteristics of the transmitted sound pressure shown in FIG. 7B, even when the threshold is decreased as much as possible, the ultrasonic microphone 11 cannot detect an obstacle in a short distance such as several tens of centimeters in the horizontal direction and an obstacle in a range of about ±90 degrees in the vertical directions.

In an example of the conventional ultrasonic sensor, which drives an ultrasonic microphone at the driving frequency of 51.6 kHz, a dead band (dead zone) shown in FIG. 8A is caused in the range about ±90 degrees in a short distance in the vertical direction from the location of the ultrasonic sensor 1. In addition, a dead band shown in FIG. 8B is caused in the range about ±90 degrees in a short distance in the horizontal direction from the location of the ultrasonic sensor 1. Thus, an obstacle cannot be detected in the dead band in both the vertical and horizontal directions. Further, in an example of the conventional ultrasonic sensor, which drives an ultrasonic microphone at the driving frequency of 45.7 kHz, as shown in FIGS. 9A, 9B, a dead band may be hardly caused in both the horizontal and vertical directions in a short distance from the location of the ultrasonic sensor 1. However, in this case, when the detect distance is increased, a road surface, a curbstone located on a road surface in a parking area, and the like may be erroneously detected. Therefore, it is hard to detect appropriately an obstacle in a long distance of several meters away.

On the contrary, the ultrasonic sensor 1 according to the present embodiment is capable of having two kinds of further excellent directivity characteristics in different ranges by alternately switching the driving frequency of the driving ultrasonic microphone 11 between 51.6 kHz and 45.7 kHz. Therefore, as shown in FIGS. 10A, 10B, the single element of the ultrasonic microphone 11 of the ultrasonic sensor 1 is capable of having a detection area with a smaller dead band. Further, according to the above structure, the resonance frequency Fp changes according to the capacitance of the capacitor C2 connected in parallel with the ultrasonic microphone 11. Therefore, without changing an overall structure of the ultrasonic microphone 11, the resonance frequency Fp can be arbitrary changed by only arbitrarily selecting a general-purpose capacitor as the capacitor C2 from capacitors having different capacitances and providing the selected capacitor to be connected in parallel with the ultrasonic microphone 11. Thus, multiple kinds of ultrasonic sensors 1 having different directivity characteristics can be easily manufactured.

Figure 11:
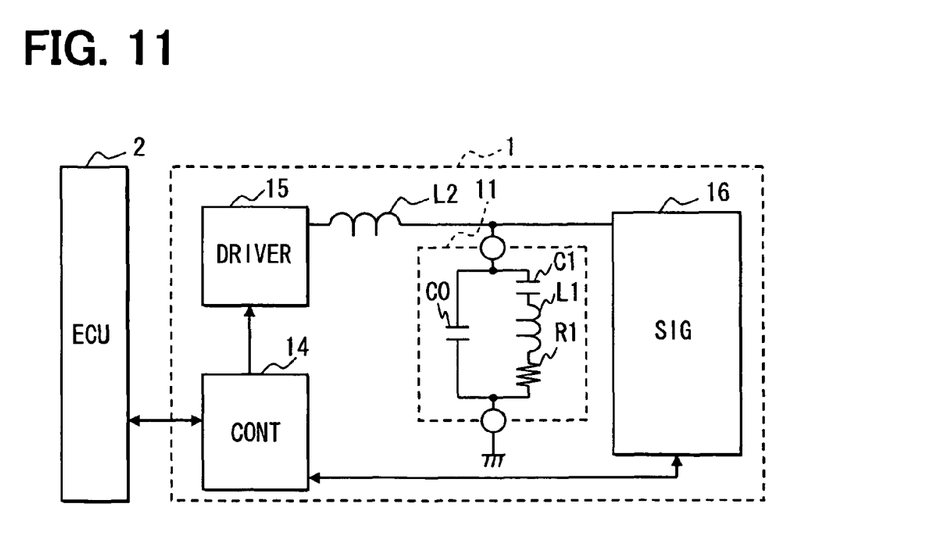
FIG. 11 is a schematic diagram showing an overview structure of an ultrasonic sensor according to another embodiment.

In the above embodiment, the capacitor C2 is connected in parallel with the ultrasonic microphone 11. It is noted that, the structure of the ultrasonic sensor 1 is not limited to the above-described structure. For example, as shown in FIG. 11, the capacitor C2 may not be connected to the ultrasonic microphone 11. Even in the present structure, the resonance frequency F0 is determined according to a relational expression of $F0=[1/(4\cdot\pi^2\cdot\text{inductance of L1}\cdot\text{capacitance of C1})]^{0.5}$. In addition, the resonance frequency Fp is determined according to a relational expression of $Fp=[1/(4\cdot\pi^2\cdot\text{inductance of L2}\cdot\text{capacitance of C0})]^{0.5}$. Therefore, two directivity characteristics each having a higher sensitivity can be easily switched in the single element of the ultrasonic microphone 11 of the ultrasonic sensor 1.

Figure 12:
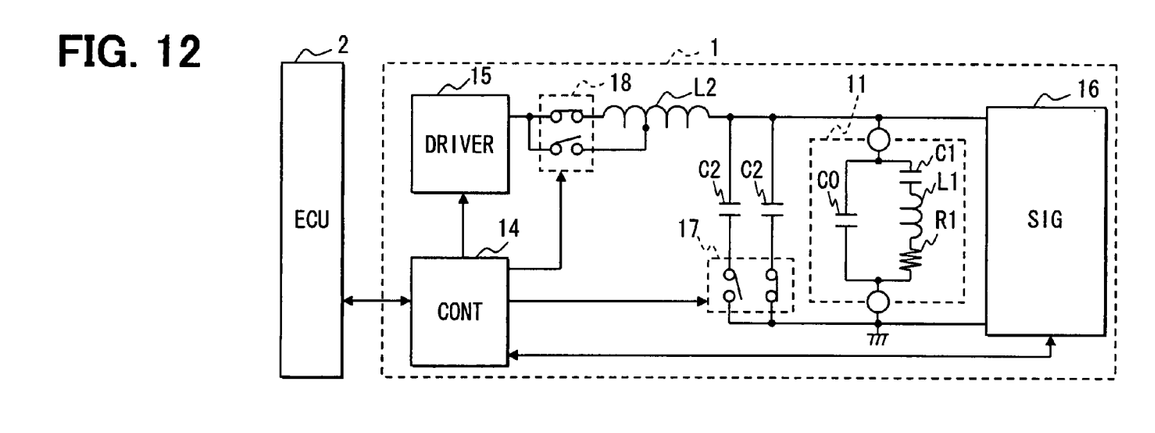
FIG. 12 is a schematic diagram showing an overview structure of an ultrasonic sensor according to another embodiment.

The present invention is not limited to the above-described embodiment. The technical scope of the present invention further includes at least the following embodiment(s). As follows, another embodiment will be described with reference to FIG. 12. FIG. 12 is a block diagram showing an overview structure of an example of the ultrasonic sensor 1.

The ultrasonic sensor 1 shown in FIG. 12 is different from the ultrasonic sensor 1 in additional multiple capacitors C2 each connected in parallel with the ultrasonic microphone 11 and an additional function to switch an inductance of inductor L2 stepwise so as to enable separately switching of an effective state and an invalid state of each connection of the capacitors C2 and the inductor L2. Specifically, as shown in FIG. 12, switches 17 are respectively provided to the multiple capacitors C2 for switching an effective state and an invalid state of each connection of the multiple capacitors C2 according to an instruction from the control unit 14. The resonance frequency Fp can be changed stepwise by changing the switching state (connection state) of each of the multiple switches 17 so as to change the number of the capacitors C2 connected in parallel with the ultrasonic microphone 11. In the example shown in FIG. 12, the resonance frequency Fp is changed stepwise by changing the switching state of each of the two switches 17 so as to set the number of the capacitors C2, which are connected in parallel with the ultrasonic microphone 11, to one of 0, 1, and 2, stepwise.

As shown in FIG. 12, switches 18 are respectively provided to the multiple inductors L2 for switching an effective state and an invalid state of each connection of the multiple inductors L2 according to an instruction from the control unit 14. The resonance frequency Fp can be changed stepwise by changing the switching state of each of the multiple switches 18 so as to change the number of inductors L2 connected in series between the drive circuit 15 and the ultrasonic microphone 11. In the example shown in FIG. 12, the resonance frequency Fp is changed stepwise by changing the switching state of each of the two switches 18 so as to set the number of the inductors L2, which are connected in series between the drive circuit 15 and the ultrasonic microphone 11, to one of 1 and 2. In the example shown in FIG. 12, the number of the capacitors C2, which are connected in parallel with the ultrasonic microphone 11, is set to one of 0, 1, and 2 stepwise by switching the switching state of each of the two switches 17. In addition, the number of the inductors L2, which are connected in series between the ultrasonic microphone 11 and the drive circuit 15, is set to one of 1 and 2 by changing the switching state of each of the two switches 18. Consequently, one of 3×2=6 kinds of the values of the resonance frequency Fp can be selected.

In the present embodiment, the number of capacitors C2 connected in parallel with the ultrasonic microphone 11 is changed in three steps by changing the switching state of each of the two switches 17. The switching structure of the capacitors C2 is not limited to the present structure. For example, the number of the capacitors C2 connected in parallel with the ultrasonic microphone 11 may be changed in two steps by changing a switching state of one switch 17. Alternatively, the number of capacitors C2 connected in parallel with the ultrasonic microphone 11 may be changed in four or more steps by changing a switching state of each of three or more switches 17 stepwise. Further, in the present embodiment, the number of inductors L2 connected in series between the ultrasonic microphone 11 and the drive circuit 15 is changed in two steps by changing the switching state of each of the two switches 18. The switching structure of the inductors L2 is not limited to the present structure. For example, the number of inductors L2 connected in series between the ultrasonic microphone 11 and the drive circuit 15 may be changed in three or more steps by changing the switching state of each of three or more switches 18.

Furthermore, in the present embodiment, an effective state and an invalid state of each connection of the multiple inductors L2 are switched therebetween to change the inductance of the inductor L2 stepwise. The switching structure of the inductors L2 is not limited to the present structure. For example, an intermediate tap may be provided to a single element of an inductor L2, and the inductance of the inductor L2 may be changed stepwise by switching electrical connection of the intermediate tap. Another method for changing the inductance of the inductor L2 stepwise may be employed. Furthermore, in the present embodiment, the resonance frequency Fp is changed stepwise by switching an effective state and an invalid state of each connection of the multiple capacitors C2. In addition, the resonance frequency Fp is changed stepwise by changing the inductance of the inductor L2. The switching structure is not limited to the present structure. For example, the resonance frequency Fp may be changed stepwise by only switching an effective state and an invalid state of each connection of the multiple capacitors C2. In addition, the resonance frequency Fp may be changed stepwise by only changing the inductance of the inductor L2.

In any of the above structures, one of two or more values of the resonance frequency Fp can be selected. Therefore, the single element of the ultrasonic microphone 11 of the ultrasonic sensor 1 is capable of easily selecting excellent one of three or more directivity characteristics having different ranges. Further, in any of the above structures, one specific frequency can be precisely selected from the driving frequencies according to the detection distance. Thereby, a directivity characteristic can be further appropriately selected according to the detection distance, and the detection areas can be further easily specified.

In the above embodiment, the inductor L2 is connected in series between the ultrasonic microphone 11 and the drive circuit 15. It is noted that, the structure of the ultrasonic sensor 1 is not limited to the above-described structure. For example, a transformer TR may be connected between the ultrasonic microphone 11 and the drive circuit 15. Henceforth, the ultrasonic sensor including the transformer TR between the ultrasonic microphone 11 and the drive circuit 15 is denoted by an ultrasonic sensor 1a. For example, instead of the inductor L2 of the ultrasonic sensor 1 shown in FIG. 11, the transformer TR may be provided to configure the ultrasonic sensor 1a shown in FIG. 13. Even in the present structure, an excellent peak can be obtained in the sound pressure transmitted from the ultrasonic microphone 11 at a driving frequency same as the resonance frequency F0 of the equivalent series capacitor C1 and the equivalent series inductor L1. In addition, an excellent peak can be obtained in the sound pressure transmitted from the ultrasonic microphone 11 at a driving frequency same as the resonance frequency Fp of the equivalent parallel capacitor C0 and the transformer TR. Therefore, similarly to the ultrasonic sensor 1, one excellent directivity characteristic can be further easily selected from the multiple directivity characteristics having different ranges in a single element of the ultrasonic microphone 11 in the ultrasonic sensor 1a.

Figure 13:
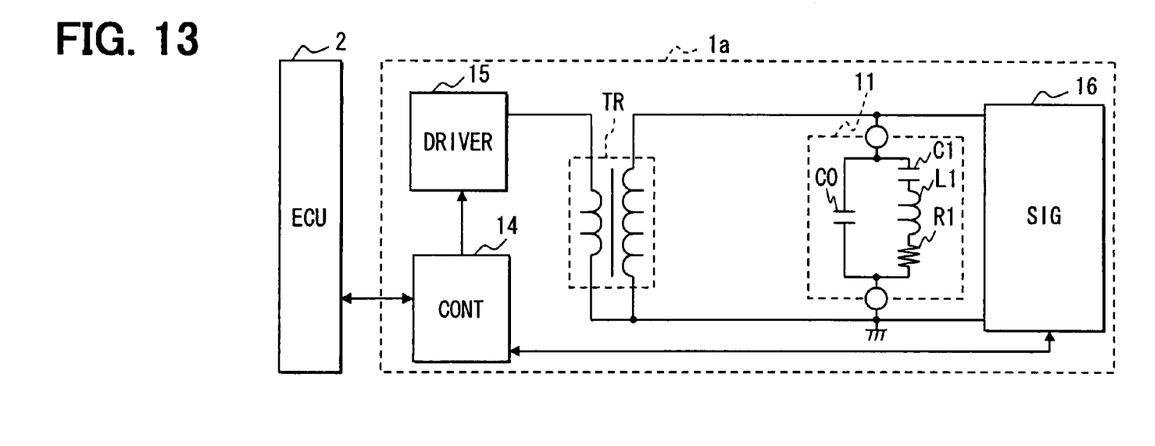
FIG. 13 is a block diagram showing an overview structure of an example of an ultrasonic sensor according to another embodiment.

In the ultrasonic sensor 1a shown in FIG. 13, the resonance frequency F0 is determined according to a relational expression of $F0=[1/(4\cdot\pi^2\cdot\text{inductance of L1}\cdot\text{capacitance of C1})]^{0.5}$. In addition, the resonance frequency Fp is determined according to a relational expression of $Fp=[1/(4\cdot\pi^2\cdot\text{inductance component of TR}\cdot\text{capacitance of C0})]^{0.5}$. Therefore, one directivity characteristic with higher sensitivity can be further easily selected from two directivity characteristics in the single element of the ultrasonic microphone 11 of the ultrasonic sensor 1.

Figure 14:
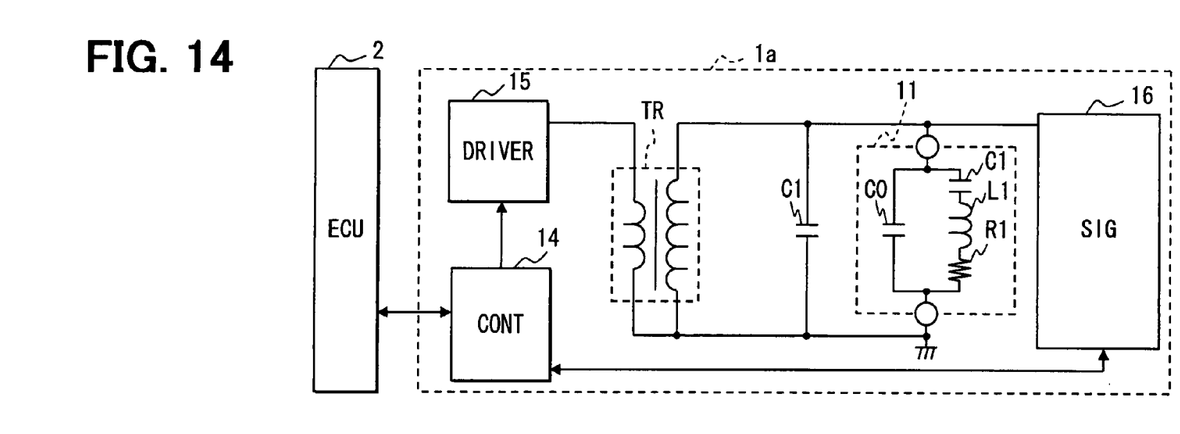
FIG. 14 is a block diagram showing an overview structure of an example of an ultrasonic sensor according to another embodiment.

Alternatively, for example, instead of the inductor L2 of the ultrasonic sensor 1 shown in FIG. 2, the transformer TR may be provided to configure the ultrasonic sensor 1a shown in FIG. 14. Even in the present structure, similarly to the ultrasonic sensor 1, one excellent directivity characteristic can be further easily selected from the multiple directivity characteristics having different ranges in a single element of the ultrasonic microphone 11 in the ultrasonic sensor 1a. Further, according to the present structure, the resonance frequency Fp changes according to the capacitance of the capacitor C2 connected in parallel with the ultrasonic microphone 11. Therefore, without changing an overall structure of the ultrasonic microphone 11, the resonance frequency Fp can be arbitrary changed by only arbitrarily selecting a general-purpose capacitor as the capacitor C2 from capacitors having different capacitances and providing the selected capacitor to be connected in parallel with the ultrasonic microphone 11. Thus, multiple kinds of ultrasonic sensors 1a having different directivity characteristics can be easily manufactured.

Figure 15:
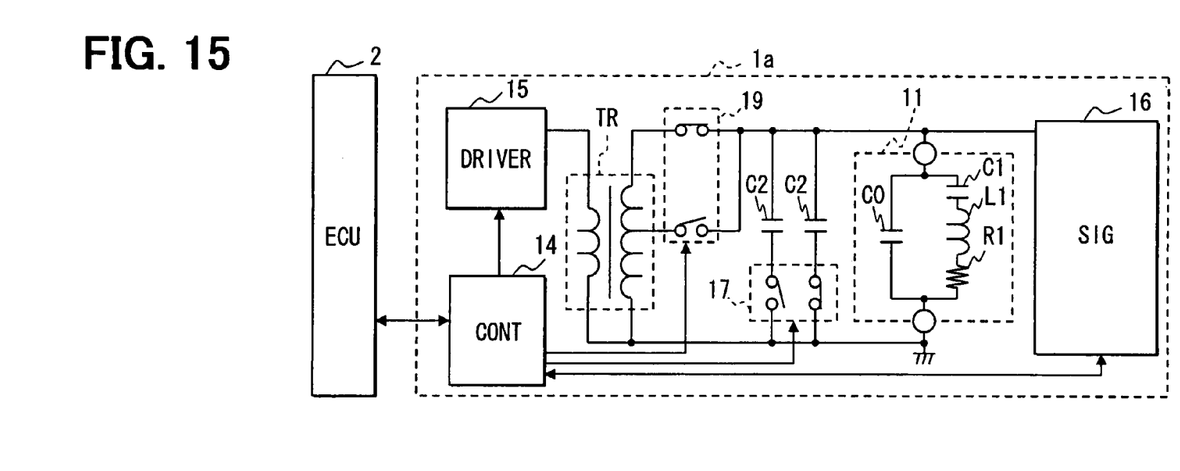
FIG. 15 is a block diagram showing an overview structure of an example of an ultrasonic sensor according to another embodiment.

Alternatively, for example, instead of the inductor L2 of the ultrasonic sensor 1 shown in FIG. 12, the transformer TR may be provided to configure the ultrasonic sensor 1a shown in FIG. 15. In the structure of FIG. 12, an effective state and an invalid state of each connection of the multiple inductors L2 is switched. On the contrary, in the structure of FIG. 15, the transformer TR as a single element has an intermediate tap, and an inductance component of the transformer TR is switched stepwise. In connection with provision of the intermediate tap, multiple switches 19 are provided in the structure of FIG. 15, instead of the switches 18 of FIG. 12. A switching state of each of the multiple switches 19 is changed according to an instruction from the ECU 2 to enable stepwise switching of an inductance of the transformer TR connected between the ultrasonic microphone 11 and the drive circuit 15. The resonance frequency Fp can be changed stepwise by changing the switching state of each of the multiple switches 19 so as to set one of a connection with a high-voltage terminal (original terminal) of the transformer TR and a connection with the intermediate tap of the transformer TR to be in an effective state. In the example shown in FIG. 15, a switching state of the two switches 19 is changed to so as to stepwise set one of the connection with the high-voltage terminal (original terminal) of the transformer TR and the connection with the intermediate tap of the transformer TR, thereby to stepwise change the resonance frequency Fp.

Even in the present structure, similarly to the ultrasonic sensor 1, one excellent directivity characteristic can be further easily selected from the multiple directivity characteristics having different ranges in the single element of the ultrasonic microphone 11 in the ultrasonic sensor 1a. In the present structure, one of two or more values of the resonance frequency Fp can be also selected. Therefore, the single element of the ultrasonic microphone 11 of the ultrasonic sensor 1a is capable of easily selecting excellent one of three or more directivity characteristics having different ranges. Further, in the present structure, one specific frequency can be precisely selected from the driving frequencies according to the detection distance. Thereby, a directivity characteristic can be further appropriately selected according to the detection distance, and the detection areas can be further easily specified.

According to the above embodiment, the ultrasonic microphone 11 includes one combination of the equivalent series capacitor C1, the equivalent series inductor L1, and the equivalent series resistance R1. The structure of the ultrasonic microphone 11 is not limited to the above-described structure. For example, the ultrasonic microphone 11 may include two or more combinations of the equivalent series capacitor C1, the equivalent series inductor L1, and the equivalent series resistance R1.

According to the above embodiment, the ultrasonic sensor 1, 1a is applied to the obstacle detecting system 100 of a vehicle. The application of the ultrasonic sensor 1, 1a is not limited to the above-described example. For example, the ultrasonic sensor 1, 1a may be applied to another system for detecting an object using an ultrasonic wave.

Summarizing the above embodiments, the ultrasonic sensor includes a single element of an ultrasonic transducer including at least one combination of an equivalent series capacitor C1, an equivalent series inductor L1, and an equivalent series resistance R1. The ultrasonic transducer further includes an equivalent parallel capacitor C0. The ultrasonic sensor further includes a drive circuit configured to drive the ultrasonic transducer. An inductor L2 is connected in series between the ultrasonic transducer and the drive circuit. The drive circuit is configured to switch a driving frequency of the ultrasonic transducer. A resonance frequency of the equivalent series capacitor C1 and the equivalent series inductor L1 is F0. A resonance frequency determined by at least the equivalent parallel capacitor C0 and the inductor L2 is Fp. The drive circuit is configured to drive the ultrasonic transducer while switching the driving frequency to one of the resonance frequency F0 and the resonance frequency Fp.

The present inventor researched a single element of an ultrasonic transducer including at least one combination of an equivalent series capacitor C1, an equivalent series inductor L1, and an equivalent series resistance R1, and further an equivalent parallel capacitor C0. Consequently, the present inventor investigated that when an inductor L2 is connected between a drive circuit, which drives the ultrasonic transducer, and the ultrasonic transducer, an excellent peak is obtained in a sound pressure transmitted from the ultrasonic transducer at a driving frequency same as a resonance frequency F0 of the equivalent series capacitor C1 and the equivalent series inductor L1. In addition, the present inventor investigated that another excellent peak is obtained in a sound pressure transmitted from the ultrasonic transducer at a driving frequency same as a resonance frequency Fp determined by at least the equivalent parallel capacitor C0 and the inductor L2.

In the present structure, an excellent peak is obtained in a sound pressure transmitted from the ultrasonic transducer at the driving frequency same as the resonance frequency F0. In addition, another excellent peak is obtained in a sound pressure transmitted from the ultrasonic transducer at the driving frequency same as the resonance frequency Fp. Therefore, when the ultrasonic transducer is driven while switching the driving frequency, an excellent transmitted sound pressure can be generated at each of multiple driving frequency by only driving the ultrasonic transducer while switching the driving frequency to one of the resonance frequency F0 and the resonance frequency Fp. Therefore, an excellent directivity characteristic can be further easily selected arbitrary from the directivity characteristics in the single element of the ultrasonic transducer of the ultrasonic sensor.

A directivity characteristic of a sound pressure transmitted from the ultrasonic transducer becomes wide when the driving frequency becomes low and becomes narrow when the driving frequency becomes high. Therefore, according to the present structure, the single element of the ultrasonic transducer of the ultrasonic sensor can have multiple kinds of excellent directivity characteristics in different ranges by switching the driving frequency. Thus, a suitable directivity characteristic can be obtained by arbitrary selecting one of the driving frequencies according to a detection distance. Thereby, the detection areas can be easily set according to the detection distance. In addition, a detection area of the single element of the ultrasonic sensor can be further enlarged. Thus, the number of ultrasonic sensor elements can be reduced in a condition where multiple conventional ultrasonic sensor elements having different directivity characteristics are required for encompassing a large detection area.

In the ultrasonic sensor, the resonance frequency determined by the equivalent parallel capacitor C0 and the inductor L2 may be a resonance frequency of the equivalent parallel capacitor C0 and the inductor L2. The drive circuit is configured to drive the ultrasonic transducer while switching the driving frequency to one of the resonance frequency F0 and the resonance frequency Fp. The resonance frequency F0 is determined according to a relational expression of $F0=[1/(4\cdot\pi^2\cdot\text{inductance of L1}\cdot\text{capacitance of C1})]^{0.5}$. The resonance frequency Fp is determined according to a relational expression of $Fp=[1/(4\cdot\pi^2\cdot\text{inductance of L2}\cdot\text{capacitance of C0})]^{0.5}$. In the present structure, the resonance frequency F0 is one unique value, and the resonance frequency Fp is another unique value. Therefore, the single element of the ultrasonic transducer of the ultrasonic sensor is capable of easily selecting excellent one of two directivity characteristics having different ranges.

The ultrasonic sensor may further include a capacitor C2 connected in parallel with the ultrasonic transducer. The resonance frequency determined by the equivalent parallel capacitor C0 and the inductor L2 may be a resonance frequency of the equivalent parallel capacitor C0, the capacitor C2, and the inductor L2. The drive circuit is configured to drive the ultrasonic transducer while switching the driving frequency to one of the resonance frequency F0 and the resonance frequency Fp. The resonance frequency F0 is determined according to a relational expression of $F0=[1/(4\cdot\pi^2\cdot\text{inductance of L1}\cdot\text{capacitance of C1})]^{0.5}$. The resonance frequency Fp is determined according to a relational expression of $Fp=[1/\{4\cdot\pi^2\cdot\text{inductance of L2}\cdot(\text{capacitance of C0}+\text{capacitance of C2})\}]^{0.5}$. In the present structure, the resonance frequency F0 is one unique value, and the resonance frequency Fp is another unique value. Therefore, the single element of the ultrasonic transducer of the ultrasonic sensor is capable of easily selecting excellent one of two directivity characteristics having different ranges. Further, according to the present structure, the resonance frequency Fp changes according to the capacitance of the capacitor C2 connected in parallel with the ultrasonic transducer. Therefore, without changing an overall structure of the ultrasonic transducer, the resonance frequency Fp can be arbitrary changed by only arbitrarily selecting a capacitor as the capacitor C2 from capacitors having different capacitances and providing the selected capacitor to be connected in parallel with the ultrasonic transducer. Thus, multiple kinds of ultrasonic sensors having different directivity characteristics can be easily manufactured.

In the ultrasonic sensor, the inductor L2 may be connected in series between the ultrasonic transducer and the drive circuit so that an inductance can be changed stepwise. The resonance frequency determined by the equivalent parallel capacitor C0 and the inductor L2 may be a resonance frequency of the equivalent parallel capacitor C0 and the inductor L2, in which an inductance can be changed stepwise. The drive circuit is configured to drive the ultrasonic transducer while switching the driving frequency to one of the resonance frequency F0 and the resonance frequency Fp. According to the present structure, the inductor L2 is connected in series between the ultrasonic transducer and the drive circuit so that an inductance can be changed stepwise. Therefore, the resonance frequency Fp can be selected from multiple values. Therefore, one excellent directivity characteristic can be further easily selected arbitrary from three or more directivity characteristics having different directivity ranges in the single element of the ultrasonic transducer of the ultrasonic sensor.

The ultrasonic sensor may further include multiple capacitors C2 each connected in parallel with the ultrasonic transducer. The multiple capacitors C2 may be connected so that a connection state of each of the multiple capacitors C2 can be individually switched between an effective state and an invalid state. The resonance frequency determined by the equivalent parallel capacitor C0 and the inductor L2 may be a resonance frequency of the equivalent parallel capacitor C0, the capacitor C2, a connection state of which is an effective state, and the inductor L2. The drive circuit is configured to drive the ultrasonic transducer while switching the driving frequency to one of the resonance frequency F0 and the resonance frequency Fp. According to the present structure, the multiple capacitors C2 are connected so that a connection state of each of the multiple capacitors C2 can be individually switched between an effective state and an invalid state. Therefore, the resonance frequency Fp can be selected from multiple values. Therefore, one excellent directivity characteristic can be further easily selected arbitrary from three or more directivity characteristics having different directivity ranges in the single element of the ultrasonic transducer of the ultrasonic sensor.

The ultrasonic sensor may further include multiple capacitors C2 each connected in parallel with the ultrasonic transducer. The multiple capacitors C2 may be connected so that a connection state of each of the multiple capacitors C2 can be individually switched between an effective state and an invalid state. The inductor L2 may be connected in series between the ultrasonic transducer and the drive circuit so that an inductance is variable stepwise. The resonance frequency determined by the equivalent parallel capacitor C0 and the inductor L2 may be a resonance frequency of the equivalent parallel capacitor C0, the capacitor C2, a connection state of which is an effective state, and the inductor L2, an inductance of which is variable stepwise. The drive circuit is configured to drive the ultrasonic transducer while switching the driving frequency to one of the resonance frequency F0 and the resonance frequency Fp. According to the present structure, the inductor L2 is connected in series between the ultrasonic transducer and the drive circuit so that an inductance is variable stepwise. In addition, the multiple capacitors C2 are connected so that a connection state of each of the multiple capacitors C2 can be individually switched between an effective state and an invalid state. Therefore, the resonance frequency Fp can be selected from multiple values. Therefore, one excellent directivity characteristic can be further easily selected arbitrary from three or more directivity characteristics having different directivity ranges in the single element of the ultrasonic transducer of the ultrasonic sensor. Further, in the present structure, one specific frequency can be precisely selected from the driving frequencies according to the detection distance. Thereby, a directivity characteristic can be further appropriately selected according to the detection distance, and the detection areas can be further easily specified.

The ultrasonic sensor includes a single element of an ultrasonic transducer including at least one combination of an equivalent series capacitor C1, an equivalent series inductor L1, and an equivalent series resistance. R1. The ultrasonic transducer further includes an equivalent parallel capacitor C0. The ultrasonic sensor further includes a drive circuit configured to drive the ultrasonic transducer. A transformer TR is connected between the ultrasonic transducer and the drive circuit. The drive circuit is configured to switch a driving frequency of the ultrasonic transducer. A resonance frequency of the equivalent series capacitor C1 and the equivalent series inductor L1 is F0. A resonance frequency determined by at least the equivalent parallel capacitor C0 and the transformer TR is Fp. The drive circuit is configured to drive the ultrasonic transducer while switching the driving frequency to one of the resonance frequency F0 and the resonance frequency Fp.

The present inventor researched a single element of an ultrasonic transducer including at least one combination of an equivalent series capacitor C1, an equivalent series inductor L1, and an equivalent series resistance R1, and further an equivalent parallel capacitor C0. Consequently, the present inventor investigated that when an transformer TR is connected between a drive circuit, which drives the ultrasonic transducer, and the ultrasonic transducer, an excellent peak is obtained in a sound pressure transmitted from the ultrasonic transducer at a driving frequency same as a resonance frequency F0 of the equivalent series capacitor C1 and the equivalent series inductor L1. In addition, the present inventor investigated that another excellent peak is obtained in a sound pressure transmitted from the ultrasonic transducer at a driving frequency same as a resonance frequency Fp determined by at least the equivalent parallel capacitor C0 and the transformer TR.

In the present structure, an excellent peak is obtained in a sound pressure transmitted from the ultrasonic transducer at the driving frequency same as the resonance frequency F0. In addition, another excellent peak is obtained in a sound pressure transmitted from the ultrasonic transducer at the driving frequency same as the resonance frequency Fp. Therefore, when the ultrasonic transducer is driven while switching the driving frequency, an excellent transmitted sound pressure can be generated at each of multiple driving frequency by only driving the ultrasonic transducer while switching the driving frequency to one of the resonance frequency F0 and the resonance frequency Fp. Therefore, the directivity characteristics can be further easily switched arbitrary to obtain an excellent directivity in the single element of the ultrasonic transducer of the ultrasonic sensor.

A directivity characteristic of a sound pressure transmitted from the ultrasonic transducer becomes wide when the driving frequency becomes low and becomes narrow when the driving frequency becomes high. Therefore, according to the present structure, the single element of the ultrasonic transducer of the ultrasonic sensor can have multiple kinds of excellent directivity characteristics in different ranges by switching the driving frequency. Therefore, a detection area of the single element of the ultrasonic sensor can be further enlarged. Thus, the number of ultrasonic sensor elements can be reduced in a condition where multiple conventional ultrasonic sensor elements having different directivity characteristics are required for encompassing a large detection area.

In the ultrasonic sensor, the resonance frequency determined by the equivalent parallel capacitor C0 and the transformer TR may be a resonance frequency of the equivalent parallel capacitor C0 and the transformer TR. The drive circuit is configured to drive the ultrasonic transducer while switching the driving frequency to one of the resonance frequency F0 and the resonance frequency Fp. The resonance frequency F0 is determined according to a relational expression of $F0=[1/(4 \cdot \pi^2 \cdot \text{inductance of L1} \cdot \text{capacitance of C1})]^{0.5}$. The resonance frequency Fp is determined according to a relational expression of $Fp=[1/(4 \cdot \pi^2 \cdot \text{inductance component of TR} \cdot \text{capacitance of C0})]^{0.5}$. In the present structure, the resonance frequency F0 is one unique value, and the resonance frequency Fp is another unique value. Therefore, the single element of the ultrasonic transducer of the ultrasonic sensor is capable of easily selecting excellent one of two different ranges of directivity characteristics.

The ultrasonic sensor may further include a capacitor C2 connected in parallel with the ultrasonic transducer. The resonance frequency determined by the equivalent parallel capacitor C0 and the transformer TR may be a resonance frequency of the equivalent parallel capacitor C0, the capacitor C2, and the transformer TR. The drive circuit is configured to drive the ultrasonic transducer while switching the driving frequency to one of the resonance frequency F0 and the resonance frequency Fp. The resonance frequency F0 is determined according to a relational expression of $F0=[1/(4 \cdot \pi^2 \cdot \text{inductance of L1} \cdot \text{capacitance of C1})]^{0.5}$. The resonance frequency Fp is determined according to a relational expression of $Fp=[1/\{4 \cdot \pi^2 \cdot \text{inductance component of TR} \cdot (\text{capacitance of C0} + \text{capacitance of C2})\}]^{0.5}$. In the present structure, the resonance frequency F0 is one unique value, and the resonance frequency Fp is another unique value. Therefore, the single element of the ultrasonic transducer of the ultrasonic sensor is capable of easily selecting excellent one of two directivity characteristics having different ranges. Further, according to the present structure, the resonance frequency Fp changes according to the capacitance of the capacitor C2 connected in parallel with the ultrasonic transducer. Therefore, without changing an overall structure of the ultrasonic transducer, the resonance frequency Fp can be arbitrary changed by only arbitrarily selecting a capacitor as the capacitor C2 from capacitors having different capacitances and providing the selected capacitor to be connected in parallel with the ultrasonic transducer. Thus, multiple kinds of ultrasonic sensors having different directivity characteristics can be easily manufactured.

In the ultrasonic sensor, the transformer TR may be connected in series between the ultrasonic transducer and the drive circuit so that an inductance component is variable stepwise. The resonance frequency determined by the equivalent parallel capacitor C0 and the transformer TR may be a resonance frequency of the equivalent parallel capacitor C0 and the transformer TR, an inductance component of which is variable stepwise. The drive circuit is configured to drive the ultrasonic transducer while switching the driving frequency to one of the resonance frequency F0 and the resonance frequency Fp. According to the present structure, the transformer TR is connected in series between the ultrasonic transducer and the drive circuit so that an inductance is variable stepwise. Therefore, the resonance frequency Fp can be selected from multiple values. Therefore, one excellent directivity characteristic can be further easily selected arbitrary from three or more directivity characteristics having different directivity ranges in the single element of the ultrasonic transducer of the ultrasonic sensor.

The ultrasonic sensor may further include multiple capacitors C2 each connected in parallel with the ultrasonic transducer. The multiple capacitors C2 may be connected so that a connection state of each of the multiple capacitors C2 can be individually switched between an effective state and an invalid state. The resonance frequency determined by the equivalent parallel capacitor C0 and the transformer TR may be a resonance frequency of the equivalent parallel capacitor C0, the capacitor C2, a connection state of which is an effective state, and the transformer TR. The drive circuit is configured to drive the ultrasonic transducer while switching the driving frequency to one of the resonance frequency F0 and the resonance frequency Fp. According to the present structure, the multiple capacitors C2 are connected so that a connection state of each of the multiple capacitors C2 can be individually switched between an effective state and an invalid state. Therefore, the resonance frequency Fp can be selected from multiple values. Therefore, one excellent directivity characteristic can be further easily selected arbitrary from three or more directivity characteristics having different directivity ranges in the single element of the ultrasonic transducer of the ultrasonic sensor.

The ultrasonic sensor may further include multiple capacitors C2 each connected in parallel with the ultrasonic transducer. The multiple capacitors C2 may be connected so that a connection state of each of the multiple capacitors C2 can be individually switched between an effective state and an invalid state. The transformer TR may be connected between the ultrasonic transducer and the drive circuit so that an inductance component is variable stepwise. The resonance frequency determined by the equivalent parallel capacitor C0 and the transformer TR may be a resonance frequency of the equivalent parallel capacitor C0, the capacitor C2, a connection state of which is an effective state, and the transformer TR, an inductance component of which is variable stepwise. The drive circuit is configured to drive the ultrasonic transducer while switching the driving frequency to one of the resonance frequency F0 and the resonance frequency Fp. According to the present structure, the transformer TR is connected in series between the ultrasonic transducer and the drive circuit so that an inductance component is variable stepwise. In addition, the multiple capacitors C2 are connected so that a connection state of each of the multiple capacitors C2 can be individually switched between an effective state and an invalid state. Therefore, the resonance frequency Fp can be selected from multiple values. Therefore, one excellent directivity characteristic can be further easily selected arbitrary from three or more directivity characteristics having different directivity ranges in the single element of the ultrasonic transducer of the ultrasonic sensor. Further, in the present structure, one specific frequency can be precisely selected from the driving frequencies according to the detection distance. Thereby, a directivity characteristic can be further appropriately selected according to the detection distance, and the detection areas can be further easily specified.

The above processings are not limited being executed by the ECU 2. The control unit may have various structures including the ECU 2 shown as an example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:
1. An ultrasonic sensor comprising:
   a single element of an ultrasonic transducer including
      at least one combination of an equivalent series capacitor C1, an equivalent series inductor L1, and an equivalent series resistance R1, and
      an equivalent parallel capacitor C0;
   a drive circuit configured to drive the ultrasonic transducer; and
   an inductor L2 connected in series between the ultrasonic transducer and the drive circuit,
   wherein the drive circuit is configured to switch a driving frequency of the ultrasonic transducer,
   a first resonance frequency of the equivalent series capacitor C1 and the equivalent series inductor L1 is F0, a second resonance frequency determined by at least the equivalent parallel capacitor C0 and the inductor L2 is Fp, the drive circuit is configured to drive the ultrasonic transducer while switching the driving frequency to one of the first resonance frequency F0 and the second resonance frequency Fp to have two kinds of directivity characteristics in different ranges and to have different detection areas, and the first resonance frequency F0 is different than the second resonance frequency Fp, the first resonance frequency F0 is calculated using a first capacitance, and an inductance of the equivalent series inductor L1 and the second resonance frequency Fp is calculated using a second capacitance different than the first capacitance and an inductance component.

2. The ultrasonic sensor according to claim 1, wherein the second resonance frequency is a resonance frequency of the equivalent parallel capacitor C0 and the inductor L2.

3. The ultrasonic sensor according to claim 1, further comprising:

a capacitor C2 connected in parallel with the ultrasonic transducer, wherein the second resonance frequency is a resonance frequency of the equivalent parallel capacitor C0, the capacitor C2, and the inductor L2.

4. The ultrasonic sensor according to claim 1, wherein an inductance of the inductor L2 is variable stepwise, and the second resonance frequency is a resonance frequency of the equivalent parallel capacitor C0 and the inductor L2.

5. The ultrasonic sensor according to claim 1, further comprising:

a plurality of capacitors C2 each individually connectable in parallel with the ultrasonic transducer, the plurality of capacitors C2 configured to include an effective capacitor C2 connected in parallel with the ultrasonic transducer, and the second resonance frequency is a resonance frequency of the equivalent parallel capacitor C0, the effective capacitor C2, and the inductor L2.

6. The ultrasonic sensor according to claim 1, further comprising:

a plurality of capacitors C2 each individually connectable in parallel with the ultrasonic transducer, the plurality of capacitors C2 configured to include an effective capacitor C2 connected in parallel with the ultrasonic transducer, an inductance of the inductor L2 is variable stepwise, and the second resonance frequency is a resonance frequency of the equivalent parallel capacitor C0, the effective capacitor C2, and the inductor L2.

7. The ultrasonic sensor according to claim 1, wherein the drive circuit alternates between the first resonance frequency and the second resonance frequency when driving the ultrasonic transducer.

8. An ultrasonic sensor comprising:

a single element of an ultrasonic transducer including
at least one combination of an equivalent series capacitor C1, an equivalent series inductor L1, and an equivalent series resistance R1, and
an equivalent parallel capacitor C0;

a drive circuit configured to drive the ultrasonic transducer; and a transformer TR connected between the ultrasonic transducer and the drive circuit, wherein the drive circuit is configured to switch a driving frequency of the ultrasonic transducer, a first resonance frequency of the equivalent series capacitor C1 and the equivalent series inductor L1 is F0, a second resonance frequency determined by at least the equivalent parallel capacitor C0 and the transformer TR is Fp, the drive circuit is configured to drive the ultrasonic transducer while switching the driving frequency to one of the first resonance frequency F0 and the second resonance frequency Fp to have two kinds of directivity characteristics in different ranges and to have different detection areas, and the first resonance frequency is different than the second resonance frequency, the first resonance frequency is calculated using a first capacitance and an inductance of the equivalent series inductor L1, and the second resonance frequency is calculated using a second capacitance different than the first capacitance and an inductance component.

9. The ultrasonic sensor according to claim 8, wherein the second resonance frequency is a resonance frequency of the equivalent parallel capacitor C0 and the transformer TR.

10. The ultrasonic sensor according to claim 8, further comprising:

a capacitor C2 connected in parallel with the ultrasonic transducer, wherein the second resonance frequency is a resonance frequency of the equivalent parallel capacitor C0, the capacitor C2, and the transformer TR.

11. The ultrasonic sensor according to claim 8, wherein an inductance component of the transformer TR is variable stepwise, and the second resonance frequency is a resonance frequency of the equivalent parallel capacitor C0 and the transformer TR.

12. The ultrasonic sensor according to claim 8, further comprising:

a plurality of capacitors C2 each individually connectable in parallel with the ultrasonic transducer, the plurality of capacitors C2 configured to include an effective capacitor C2 connected in parallel with the ultrasonic transducer, and the second resonance frequency is a resonance frequency of the equivalent parallel capacitor C0, the effective capacitor C2, and the transformer TR.

13. The ultrasonic sensor according to claim 8, further comprising:

a plurality of capacitors C2 each individually connectable in parallel with the ultrasonic transducer, the plurality of capacitors C2 configured to include an effective capacitor C2 connected in parallel with the ultrasonic transducer, an inductance component of the transformer TR is variable stepwise, and the second resonance frequency is a resonance frequency of the equivalent parallel capacitor C0, the effective capacitor C2, and the transformer TR.

14. The ultrasonic sensor according to claim 8, wherein the drive circuit alternates between the first resonance frequency and the second resonance frequency when driving the ultrasonic transducer.

15. A method for driving an ultrasonic sensor, the method comprising:

causing a drive circuit to oscillate a single element of an ultrasonic transducer at a driving frequency, the ultrasonic transducer including at least one combination of an equivalent series capacitor C1, an equivalent series inductor L1, and an equivalent series resistance R1, the ultrasonic transducer further including an equivalent parallel capacitor C0, wherein one of an inductor L2 and a transformer TR is connected in series between the ultrasonic transducer and the drive circuit;

switching the driving frequency to one of a first resonance frequency F0 and a second resonance frequency Fp to have two kinds of directivity characteristics in different ranges and to have different detection areas;

calculating the first resonance frequency F0 using a first capacitance and an inductance of the equivalent series inductor L1; and calculating the second resonance frequency Fp using a second capacitance different than the first capacitance and an inductance component, wherein the first resonance frequency F0 is determined by the equivalent series capacitor C1 and the equivalent series inductor L1, wherein the second resonance frequency Fp is determined by at least the equivalent parallel capacitor C0 and the one of the inductor L2 and the transformer TR, and wherein the first resonance frequency F0 is different than the second resonance frequency Fp.

16. The method of driving an ultrasonic sensor according to claim 15, wherein the drive circuit alternates between the first resonance frequency and the second resonance frequency when driving the ultrasonic transducer.

* * * * *